(12) United States Patent
Detor et al.

(10) Patent No.: US 10,704,133 B2
(45) Date of Patent: Jul. 7, 2020

(54) COATED ARTICLE AND METHOD FOR MAKING

(71) Applicant: General Electric Company, Schenectady, NY (US)

(72) Inventors: Andrew Joseph Detor, Burnt Hills, NY (US); Richard DiDomizio, Charlton, NY (US); James Anthony Ruud, Delmar, NY (US); Soumya Nag, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 291 days.

(21) Appl. No.: 15/729,181

(22) Filed: Oct. 10, 2017

(65) Prior Publication Data

US 2019/0106779 A1 Apr. 11, 2019

(51) Int. Cl.
*C23C 4/08* (2016.01)
*C23C 4/129* (2016.01)
(Continued)

(52) U.S. Cl.
CPC .............. *C23C 4/08* (2013.01); *B23K 35/308* (2013.01); *B32B 15/01* (2013.01); *B32B 15/013* (2013.01); *B32B 15/015* (2013.01); *C09D 1/00* (2013.01); *C09D 5/00* (2013.01); *C09D 7/61* (2018.01); *C22C 19/05* (2013.01); *C23C 4/02* (2013.01); *C23C 4/06* (2013.01); *C23C 4/129* (2016.01); *C23C 24/04* (2013.01); *C23C 28/021* (2013.01);
(Continued)

(58) Field of Classification Search
None
See application file for complete search history.

(56) References Cited

U.S. PATENT DOCUMENTS 3,846,159 A * 11/1974 Bornstein ............... C23C 10/02
428/610
6,398,503 B1 6/2002 Takahashi
(Continued)

FOREIGN PATENT DOCUMENTS

EP 2781560 A1 9/2014
EP 3388559 A1 10/2018
(Continued)

OTHER PUBLICATIONS

Lesage et al., Role of residual stresses on interface toughness of thermally sprayed coatings, 2002, Thin Solid Films (415) pp. 143-150. (Year: 2002).*

(Continued)

*Primary Examiner* — David Sample
*Assistant Examiner* — Elizabeth Collister
(74) *Attorney, Agent, or Firm* — John P. Darling; The Small Patent Law Group, PLLC

(57) ABSTRACT

A system and method described herein relate to applying an overlay metal-based coating to a metal-based substrate. An article is provided, which includes a metal-based substrate having an overlay metal-based coating disposed on the substrate at an interface. The interface is configured such that a crack formed within the overlay metal-based coating and approaching the interface has a propagation path that is more energetically favorable along the interface than through the interface and into the metal-based substrate.

10 Claims, 3 Drawing Sheets

(51) Int. Cl.
    *C09D 1/00*       (2006.01)
    *C23C 28/02*     (2006.01)
    *C09D 7/61*       (2018.01)
    *C23C 4/06*       (2016.01)
    *B32B 15/01*     (2006.01)
    *C09D 5/00*       (2006.01)
    *B23K 35/30*     (2006.01)
    *C22C 19/05*     (2006.01)
    *C23C 4/02*       (2006.01)
    *C23C 24/04*     (2006.01)
    *C23C 30/00*     (2006.01)

(52) U.S. Cl.
    CPC .......... *C23C 28/023* (2013.01); *C23C 28/027* (2013.01); *C23C 30/00* (2013.01)

(56) References Cited

U.S. PATENT DOCUMENTS

| | | |
|---|---|---|
| 6,521,293 B1 | 2/2003 | Kojima et al. |
| 6,730,178 B2 | 5/2004 | Miyamoto et al. |
| 6,749,951 B1 | 6/2004 | Darolia et al. |
| 7,563,503 B2 | 7/2009 | Gell et al. |
| 9,108,276 B2 | 8/2015 | Seals |
| 2004/0079648 A1 | 4/2004 | Khan et al. |
| 2007/0259173 A1 | 11/2007 | Refke et al. |
| 2010/0151272 A1 | 6/2010 | Nardi |
| 2013/0177705 A1 | 7/2013 | Calla et al. |
| 2015/0086795 A1 | 3/2015 | Giddings |

FOREIGN PATENT DOCUMENTS

| | | |
|---|---|---|
| WO | 2004090288 A2 | 10/2004 |
| WO | 2004090288 A3 | 10/2004 |
| WO | 2014165073 A1 | 10/2014 |

OTHER PUBLICATIONS

Sadananda et al., Prediction of threshold stress intensity for fatigue crack growth using a dislocation model, International Journal of Facture (vol. 13 No. 5), 1977, pp. 585-594. (Year: 1977).*
Extended European Search Report for corresponding EP Application No. 18195399.3-1103 dated Mar. 14, 2019 (7 pages).
Anstis, "A Critical Evaluation of Indentation Techniques for Measuring Fracture Toughness: I, Direct Crack Measurements", Journal of the American Ceramic Society, vol. 64, No. 9, (6 pages).
Malzbender, "Measuring mechanical properties of coatings: a methodology applied to nano-particle-filled sol-gel coatings on glass", Materials Science and Engineering, Reports: A review Journal, (57 pages).

* cited by examiner

COATED ARTICLE AND METHOD FOR MAKING

FIELD

The subject matter described herein relates to applying an overlay metal-based coating to a metal-based substrate.

BACKGROUND

Fatigue of a substrate, such as metal, can be accelerated in environments where oxidation and/or corrosion occur. Coatings are commonly used to protect the substrate from such environments. Conventionally, a coating process is designed to maximize the adhesion strength of the coating to the substrate, as a lack of sufficient adhesion results in the coating separating from the substrate during operation. However, excessive adhesion of the coating to the substrate can create an unacceptable debit in the fatigue performance of the substrate material.

BRIEF DESCRIPTION

In an embodiment, an article is provided. The article includes a metal-based substrate having an overlay metal-based coating disposed on the substrate at an interface. The interface is configured such that a crack formed within the overlay metal-based coating and approaching the interface has a propagation path that is more energetically favorable along the interface than through the interface into the metal-based substrate.

In an embodiment, a method is provided. The method includes applying an overlay metal-based coating on a metal-based substrate. The interface between the overlay metal-based coating and metal-based substrate is configured such that a crack formed within the overlay metal-based coating and approaching the interface has a propagation path that is more energetically favorable along the interface than through the interface into the metal-based substrate. In some embodiments, the overlay metal-based coating includes a nickel-based, cobalt-based, or iron-based alloy, or any combination including one or more of these. The metal-based substrate, in some embodiments, includes a nickel-based, cobalt-based, iron-based alloy, or a combination including one or more of these. In certain embodiments, the interface between the overlay metal-based coating and the metal-based substrate has an interface toughness in a range from 0.05 to 0.5*ΔKth MPa√m.

In an embodiment, a method is provided. The method includes applying an overlay metal-based coating on a metal-based substrate using a thermal spray of a high velocity air fuel (HVAF) spray gun. The overlay metal-based coating including a nickel-based alloy, a cobalt-based alloy, or any combination including one or more of these. The metal-based substrate including a nickel-based alloy. The interface toughness between the overlay metal-based coating and the metal-based substrate has a lower bound of 0.1 MPa √m and an upper bound of 0.2*ΔKth MPa√m. The interface toughness being based on a stand of distance of the HVAF spray gun as the overlay metal-based coating is applied to the metal-based substrate. Responsive to a crack within the overlay metal-based coating, the interface toughness is configured such that the crack formed within the overlay metal-based coating and approaching an interface, between the overlay metal-based coating and the metal-based substrate, has a propagation path that is more energetically favorable along the interface than through the interface into the metal-based substrate.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
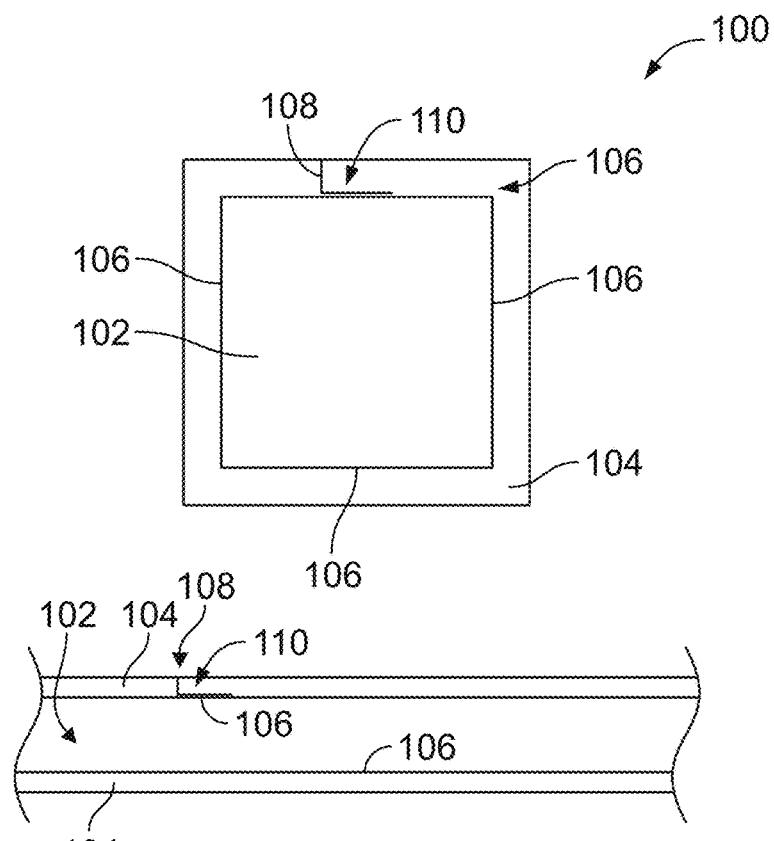
FIG. 1 is a schematic illustration of an embodiment of an overlay metal-based coating on a metal-based substrate.

Embodiments of the subject matter described herein provide systems and methods for applying an overlay metal-based coating to a metal-based substrate. The embodiments describe an approach where the interface toughness between an overlay metal-based coating and a metal-based substrate is balanced to provide both acceptable coating adhesion and fatigue performance of the system. Achieving a balance of coating adhesion and substrate fatigue performance is based on the range of coating/substrate interface toughness values. An overlay metal-based coating is a coating that depends primarily on mechanical bonding to adhere to the substrate, as opposed to metallurgical bonding such as is achieved through interdiffusion. Overlay coatings exhibit no significant diffusion of elements from the coating into the substrate, or elements from the substrate into the coating, during the deposition process. A metal-based substrate is the component that will be coated and that carries the structural load. For both the coating and substrate, the term "metal-based" as used herein means the referenced coating or substrate has a metallic character and includes more than 50 atomic percent metal elements. In one embodiment, the interface referred to herein is the surface or plane at which the overlay metal-based coating and metal-based substrate meet. In a second embodiment, the interface is defined as an additional layer of material added between the overlay metal-based coating and metal-based substrate with an upper limit defined by the surface or plane at which the metal-based coating meets the added layer and a lower limit defined by the surface or plane at which the metal-based substrate meets the added layer. The fatigue requirement can represent a number of cycles and/or required operable life of the metal-based substrate. The number of cycles can represent a number of revolutions and/or duty cycles experienced by the metal-based substrate. Additionally or alternatively, the fatigue requirement represents the operable life of equipment that includes the metal-based substrate, such as an engine, prior to failure or when repair conditions are expected and/or required to be needed.

The adhesion requirement is typically a specification of the adhesion strength of the coating to the substrate that is based on a service life of the overlay metal-based coating to be adhered to the surface of the metal-based substrate. The adhesion requirement is specified to provide a minimum amount of time for the overlay metal-based coating to adhere to the metal-based substrate and/or to provide a barrier to protect the metal-based substrate from environmental conditions. For example, the adhesion requirement is selected such that the overlay metal-based coating adheres to the metal-based substrate for the operable life of the metal-based substrate.

Over time, cracks can form and propagate through an overlay metal-based coating/metal-based substrate system in three stages: (1) overlay metal-based coating crack initiation, (2) crack propagation through the overlay metal-based coating, and (3) deflection at, or propagation through, the overlay metal-based coating/metal-based substrate interface. The time required for the first and second stages is highly dependent on service conditions experienced by the metal-based substrate and the environment.

During operation, one or more cracks may propagate through a thickness of the overlay metal-based coating, at which point any further crack propagation is considered to be in stage three. In one embodiment, the interface represents the position where the overlay metal-based coating and the metal-based substrate meet. For example, the interface can be referred to as the bottom of the overlaid metal-based coating, or the top of the metal-based substrate. The shape of the interface is based on the shape of the metal-based substrate. For example, the interface may represent a planar surface, a linear surface, a round surface, and/or the like. In one embodiment, the metal-based substrate is an uncoated material, that is, there is no other layer interposed between the substrate and the overlay coating. In an alternative embodiment a layer of material (referred to herein as "the intermediate layer") is disposed between the overlay coating and the substrate. In this embodiment, the interface is defined to include (a) the intermediate layer of material, (b) the surface or plane at which the overlay coating meets the intermediate layer, and (c) the surface or plane at which the substrate meets the intermediate layer. Thus, in this embodiment, a crack is considered to be present at the interface if its tip is positioned in any of (a), (b), or (c) described above.

During stage three, a crack that has traveled through an overlay metal-based coating and arrived at the interface, as that term is defined above, can either propagate across the interface into the metal-based substrate or deflect along the interface. The path the crack takes is based on the interface toughness of the overlay metal-based coating/metal-based substrate article. When the interface toughness is bounded by the fatigue and adhesion requirements in accordance with embodiments described herein, the crack is deflected along the interface rather than through or across the interface into the substrate material. As a result, the crack in the overlay metal-based coating extends or propagates along the interface, which does not result in a fatigue life debit of the metal-based substrate. Alternatively, when the interface toughness exceeds the fatigue and adhesion requirements the crack can undesirably propagate across the interface, because crack propagation in this situation favors travel through the substrate material relative to travel through the interface. If enough cracks are transmitted into the substrate early in life, a fatigue debit of the underlying substrate may result, resulting in, for instance, a shortening of the life of the component due to fatigue failure. For very low interface toughness values, the adhesion of the overlay metal-based coating to the metal-based substrate is also decreased. Due to this low adhesion, the overlay metal-based coating can liberate during operation, leaving one or more portions of the metal-based substrate exposed to the environment. The exposed portions of the metal-based substrate may crack early because they are exposed to the environment and lack the protection of the overlay metal-based coating. These early cracks could also lead to a debit in fatigue life.

The embodiments described herein determine a range of required interface toughness associated with a balance of fatigue life and adhesion of the overlay metal-based coating to the metal-based substrate based on a fatigue requirement and adhesion requirement. The range of interface toughness enables the overlay metal-based coating to work in balance with the metal-based substrate to provide protection from the environment and concurrently cause no, or limited, intrinsic performance debit of the metal-based substrate. The protection of the metal-based substrate by the overlay metal-based coating increases the operating life of the overlay metal-based coating/metal-based substrate article relative to an uncoated substrate operating in a similar environment. For example, the metal-based substrate may be a part of an engine (e.g., jet engine) or a gas turbine. While the description herein may focus on the jet engine or gas turbine, not all embodiments are limited to engines and turbines, and the overlay metal-based coatings for substrates of other types of equipment may be applied using the systems and methods described herein.

FIG. 1 is a schematic illustration of an embodiment of an article 100 comprising an overlay metal-based coating 104 overlaid on a metal-based substrate 102. The metal-based substrate 102 includes a nickel-based, cobalt-based, iron-based alloy, or a combination including any one or more of these. Examples of alloys include Alloy 718, Alloy 706, Alloy 725, RENE 88DT, RENE 104, RENE 65, UDIMET 720. The overlay metal-based coating 104 is configured to protect the metal-based substrate 102 from the environment. The overlay metal-based coating 104 may include a compound or a nickel-based, cobalt-base, or iron-based alloy. For example, in some embodiments the overlay metal-based coating 104 comprises an alloy such as Alloy 625, Haynes 282, Alloy 718, GT33, and/or other suitable compositions. The overlay metal-based coating 104 and the metal-based substrate 102 meet at an interface 106.

FIG. 1 further illustrates a crack 108 disposed within the overlay metal-based coating 104. As further described herein, the range of interface toughness is configured such that responsive to the crack 108 initiated within the overlay metal-based coating, the crack has a propagation path 110 that is more energetically favorable along the interface 106 interposed between the metal-based substrate 102 and the overlay metal-based coating 104 as compared to through the interface into the metal-based substrate 102.

The overlay metal-based coating 104 may be applied to the metal-based substrate 102 via any of several methods including thermal spray, electroplating, chemical vapor deposition (CVD), physical vapor deposition (PVD), or slurry-based deposition techniques. The size, shape, and complexity of the metal-based substrate 102 will dictate which of the methods advantageously lends itself to a given application. One skilled in the art for each process, when given to understand the disclosure herein, will understand what processing variable or combination of variables may be controlled to affect the interface toughness between the overlay metal-based coating and metal-based substrate, and how to increase or decrease the toughness as needed to implement the techniques disclosed herein.

In an embodiment, the metal-based coating 104 is deposited via a high velocity air fuel (HVAF) thermal spray process. HVAF processes encompass all appropriate manners of providing feedstock to an HVAF spray gun, such as by entraining feedstock powder in a flowing fluid such as gas or liquid. Many parameters can be controlled in this process that affect the interface toughness, including air and fuel pressures, powder size and feed rate, nozzle geometry, and/or the like. As a particular example, the interface toughness can be tailored by carefully controlling the distance between the end of the spray gun nozzle and the surface of the substrate material (i.e. the stand-off distance (SOD)). For instance, generally the SOD is inversely proportional to the interfacial toughness for the resultant coating.

In another embodiment, it is difficult to achieve the required interface toughness range for an interface formed directly between the overlay metal-based coating 104 and the bare metal-based substrate 102. In this case, it may be advantageous to first coat the metal-based substrate with an intermediate coating that either strongly adheres, or has an intrinsically low material toughness relative to the substrate 102, thus making a compound substrate (metal-based substrate plus the intermediate coating). The intermediate coating may comprise a nickel-based, cobalt-based, or iron-based compound or alloy and may rely on interdiffusion with the metal-based substrate for adherence. Another material selection alternative includes a ceramic-based material having less than 50 atomic percent of metallic elements. The overlay metal-based coating 104 is then applied over this compound substrate.

In another embodiment, the metal-based substrate 102 or a compound substrate surface of the metal-based substrate 102 may be altered to provide an acceptable range of interface toughness between the overlay metal-based coating 104 and the metal-based substrate 102 and/or the compound substrate surface. The surface, prior to deposition of overlay coating 104, may be modified by blasting with an abrasive material such as sand, ceramic media, glass beads, ice, or metal shot; by acid etching, by anodizing, or by peening. In one embodiment, the interface toughness is controlled directly by these surface treatment steps (for example, grit blasting aggressively to increase toughness, or lightly to decrease it).

Figure 2:
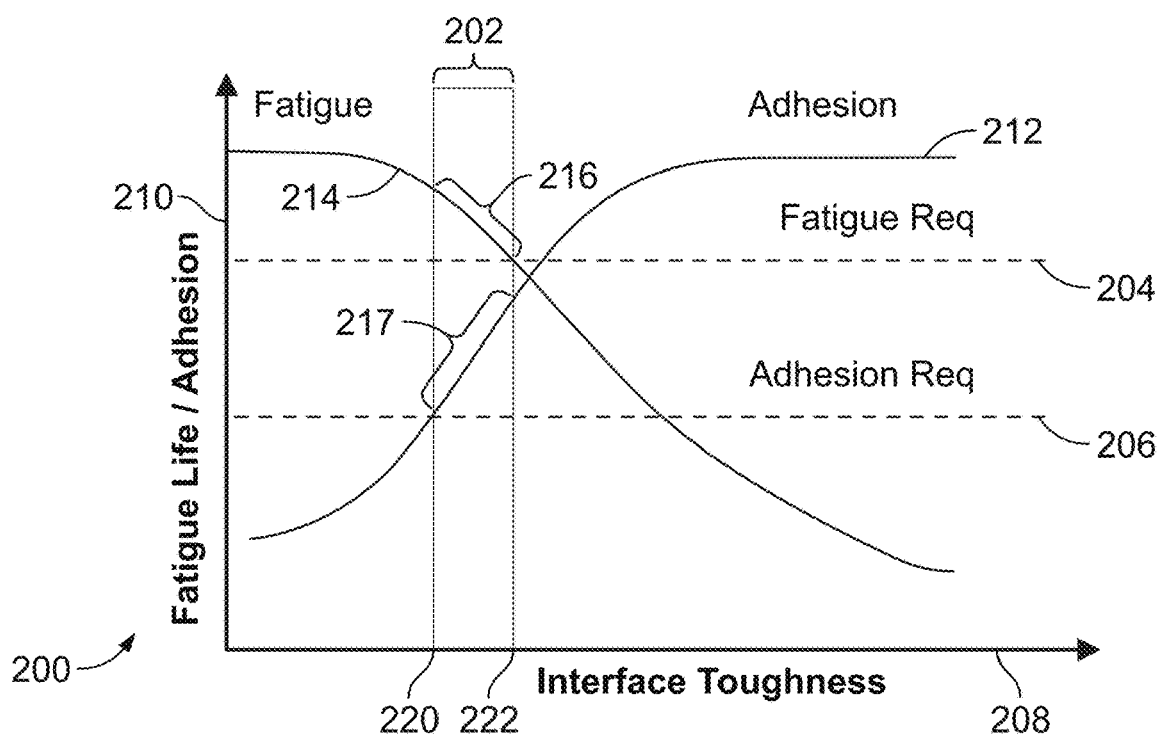
FIG. 2 is a graphical illustration of an embodiment of a range of interface toughness and related fatigue and adhesion requirements and performance.

FIG. 2 is a graphical illustration 200 of an embodiment of a range of interface toughness 202 based on fatigue and adhesion requirements 204 and 206, respectively.

The fatigue requirement 204 may represent a low cycle fatigue requirement. Low cycle fatigue represents the cyclic loading of a material under high stress where an elastic limit is exceeded and the material undergoes plastic strain. For example, low cycle fatigue can be described by the Coffin-Manson relationship where a number of cycles to failure is directly related to the plastic strain amplitude experience by the material. Additional discussion of low cycle fatigue is described in Dieter, George E., "Mechanical Metallurgy", 3rd Edition, McGraw-Hill, 1986.

Additionally or alternatively, the low cycle fatigue requirement may be based on bare metal performance of the metal-based substrate (e.g., similar to and/or the same as the metal-based substrate 102). For example, the low cycle fatigue requirement may be set such that the overlay metal-based coating (e.g., similar to and/or the same as the overlay metal-based coating 104) is configured not to debit a non-coated metal-based substrate by more than a certain percentage. The set percentage can be based on an application requirement of the metal-based substrate. For example, the metal-based substrate may be utilized in a jet engine or gas turbine with certain fatigue requirements. The set percentage of the low cycle fatigue can be zero percent, such that the overlay metal-based coating causes no debit to the operable life of the non-coated metal-based substrate. In another example, the set percentage of the low cycle fatigue may be twenty percent, such that the overlay metal-based coating debits an operable life of the non-coated metal-based substrate by twenty percent.

The fatigue requirement 204 is positioned along a vertical axis 210 representing the required fatigue life of a system (e.g., jet engine or gas turbine). The fatigue life represents a minimum number of cycles and/or operating life of the component based on the application. For example, the application of the metal-based substrate may be a part of equipment, such as an engine. The fatigue life of the metal-based substrate may represent a number of duty cycles of the engine during operational use prior to needing repair and/or operational failure.

The fatigue requirement 204 is shown relative to a fatigue life curve 214 for the article 100 of FIG. 1. The fatigue life curve 214 is the projected fatigue life of the overlay metal-based coating/metal-based substrate system based on the interface toughness along a horizontal axis 208 that represents different interface toughnesses. The fatigue life curve 214 may be based on prior experimental information or model calculations. The fatigue life curve 214 illustrates an inverse relationship with the interface toughness. For example, as the interface toughness increases, the fatigue life curve 214 decreases.

Additionally or alternatively, a lower interface toughness increases fatigue life as cracks propagating through the overlay metal-based coating are deflected at the interface between the coating and metal-based substrate and prevented from propagating into the metal-based substrate.

The adhesion requirement 206 represents a minimum number of cycles required for the overlay metal-based coating to adhere to the metal-based substrate. The adhesion requirement 206 is shown relative to an adhesion curve 212 of the overlay metal-based coating. The adhesion curve 212 may be based on prior experimental information or model calculations. The adhesion curve 212 is the projected adhesion of the overlay metal-based coating based on the interface toughness. The adhesion curve 212 illustrates a direct relationship between adhesion of the overlay metal-based coating and interface toughness; as interface toughness increases, adhesion also increases.

A range of interface toughness 202 for the overlay metal-based coating is based on the fatigue life and adhesion curves 214 and 212. For example, portions 216 and 217 of the fatigue life and adhesion curves 214 and 212, respectively, are concurrently above the fatigue and adhesion requirements 204 and 206. The portions 216 and 217 define boundaries 220 and 222 of the range of interface toughness 202 in accordance with embodiments described herein. The range of interface toughness 202 is configured such that responsive to a crack initiated within the overlay metal-based coating, the crack has a propagation path that is more energetically favorable along the interface interposed between the metal-based substrate and the overlay metal-based coating as compared to a path through the interface into the metal-based substrate. The term energetically favorable is indicative of a direction and/or path based on the energy required to incrementally propagate a crack through a material. Cracks will predominantly move or propagate along the lowest possible energy path. The range of interface toughness 202 can be defined for the limiting fatigue requirement based on the metal-based substrate fatigue crack growth threshold stress intensity (e.g., $\Delta K_{th}$). This threshold stress intensity (e.g., $\Delta K_{th}$) represents a critical stress intensity, or energy, required to propagate a crack through the interface into the metal-based substrate. For example, when the interface toughness is greater than some fraction of the metal-based substrate fatigue crack growth threshold, a crack within the overlay metal-based coating can extend or be transmitted past or through the interface into the metal-based substrate and continue propagating. The metal-based substrate fatigue crack growth threshold is based on one or more characteristics, such as the composition of the metal-based substrate and how it is processed, and is easily measured and well understood by those skilled in the art. The range of interface toughness 202 is configured to be less than some fraction of the metal-based substrate fatigue crack growth threshold, such that the propagation path of the crack is more energetically favorable to extend along the interface rather than through the interface into the metal-based substrate.

Figure 3:
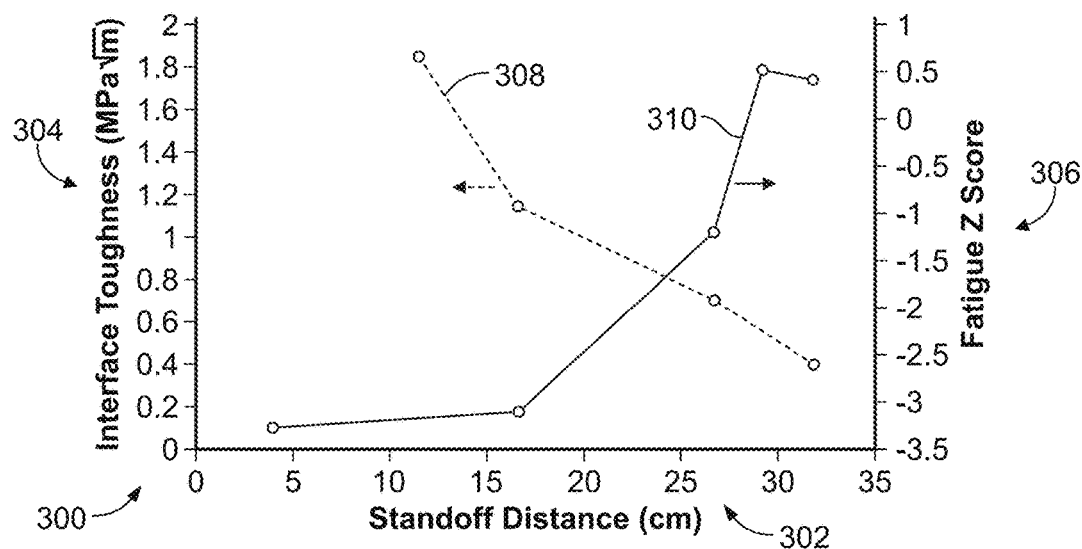
FIG. 3 is a graphical illustration of an embodiment of a stand-off distance and its relationship with an interface toughness and fatigue life.

FIG. 3 illustrates a graphical illustration 300 of an embodiment that represents both interface toughness curve 308 and fatigue life 310 as a function of the stand-off distance (SOD) 302 used in a high velocity air fuel (HVAF) coating process. FIG. 3 illustrates an example of an embodiment described herein.

The SOD is the physical distance, measured here in centimeters, between the end of the nozzle on the HVAF spray gun and the surface of the metal-based substrate. In this example, the overlay metal-based coating material was a standard bond coat composition containing cobalt, nickel, chromium, aluminum, and yttrium, and the metal-based substrate was a nickel-based alloy. The interface toughness curve 308 corresponds to the left vertical axis 304, while the fatigue life curve 310 corresponds to a Fatigue Z Score axis 306. The Fatigue Z Score axis 306 represents fatigue life as a Z score. The Z score quantifies fatigue life relative to a bare and/or uncoated metal-based substrate as the number of standard deviations from average. A negative value of the fatigue life curve 310 indicates a debit of the fatigue life of the overlay metal-based coating/metal-based substrate system. For example, a fatigue debit of approximately −3 standard deviations occurred in this particular case when the interface toughness was approximately 1.1 MPa$\sqrt{m}$. This interface toughness represents approximately one-quarter of the metal-based substrate fatigue crack growth threshold (e.g., $\Delta K_{th}$). This value, either directly measured or defined relative to substrate fatigue crack growth threshold, can be set as an upper bound of allowable interface toughness depending on the particular fatigue requirements of the application.

The interface toughness and fatigue life correlation and ranges, in this example as a function of SOD, was a surprising result because, based on conventional practice in the art, interface toughness is typically maximized for coating adhesion, and fatigue life is simply a net result of the process. Here, as shown in FIG. 3, it is observed that fatigue life can be improved by incrementally reducing interface toughness so that an overlay metal-based coating/metal-based substrate article can be balanced for both acceptable fatigue and adhesion requirements. In one embodiment, a minimum interface toughness is at least about 0.05 MPa$\sqrt{m}$ to satisfy the adhesion requirement 206 (as shown in FIG. 2). Combined with the fatigue requirement discussed above, an interface toughness in a range defined by an upper bound and a lower bound. The lower bound is in a lower bound range from about 0.05 MPa$\sqrt{m}$ to about 0.2 MPa$\sqrt{m}$. The upper bound is in an upper bound range from about $0.2*\Delta K_{th}$ MPa$\sqrt{m}$ to about $0.5*\Delta K_{th}$ MPa$\sqrt{m}$, where $\Delta K_{th}$ is the fatigue crack growth threshold stress intensity of the substrate. An interface toughness in such a range can then meet the performance criteria for both the fatigue and adhesion requirements 204 and 206, which in this case sets the SOD of the HVAF spray gun to be between about 17 and 32 cm (e.g., it may be noted that 32 cm was the highest SOD studied here). More generally, the interface toughness may be represented as a range. For example, the lower bound is set as an absolute toughness, and the upper bound of the range is specified as a fraction of the metal-based substrate fatigue crack growth threshold value. The lower bound of the range is specified to satisfy the adhesion requirement 206 for the article 100. In one embodiment, the lower bound of the range is at least about 0.05 MPa$\sqrt{m}$; in some embodiments, such as where comparatively higher adhesion of the coating is deemed to be desirable, the lower bound may be set higher, such as at least about 0.1 MPa$\sqrt{m}$. In one embodiment, the lower bound is 0.2 MPa$\sqrt{m}$. Moreover, as noted above, the upper bound of the range is specified to satisfy the particular fatigue requirements of the application. In some embodiments, the upper bound of the range is less than about $0.5*\Delta K_{th}$ MPa$\sqrt{m}$. For example, the upper bound of the range can be $0.25*\Delta K_{th}$ MPa$\sqrt{m}$ in one embodiment. In certain embodiments where fatigue debit is of particular concern, the upper bound may be set to a lower value, such as, for example, less than about $0.25*\Delta K_{th}$ MPa$\sqrt{m}$ and/or less than about $0.2*\Delta K_{th}$ $\sqrt{m}$. In one embodiment, the upper bound is $0.2*\Delta K_{th}$ MPa$\sqrt{m}$. The actual range specified for a particular embodiment may be any combination of the upper and lower bounds described above. For example, the interface toughness may be in a range from at least about 0.05 MPa$\sqrt{m}$ to less than about $0.5*\Delta K_{th}$ MPa$\sqrt{m}$. In another example, the interface toughness may be in a range from at least about 0.1 MPa$\sqrt{m}$ to less than about $0.25*\Delta K_{th}$ MPa$\sqrt{m}$. In another example, the interface toughness may be in a range from at least about 0.1 MPa$\sqrt{m}$ to less than about $0.2*\Delta K_{th}$ MPa$\sqrt{m}$. It may be noted that other combination of lower and upper bounds can be utilized as noted above.

Figure 4:
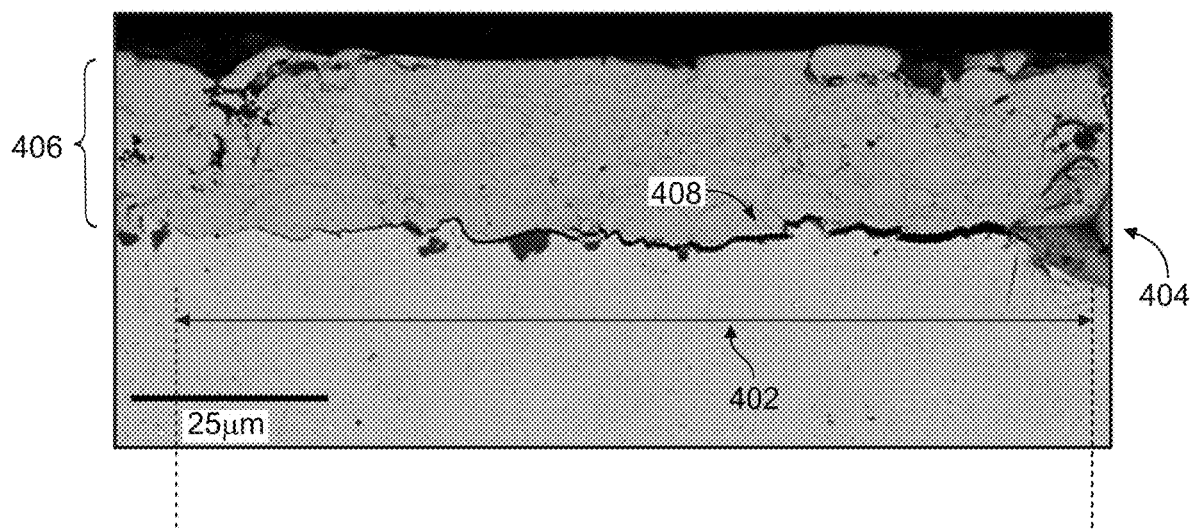
FIG. 4 illustrates a crack of an embodiment for an overlay metal-based coating formed from an indenter.

The interface toughness curve 308 was formed based on experimental data from overlay metal-based coatings 406 as shown in FIG. 4, applied at various SODs on metal-based substrates. The interface toughness was measured by applying an indenter directly on the interface between the overlay metal-based coating and metal based substrate under precisely controlled load. Under sufficient load, a crack 408 is formed along the interface due to the impression of the indenter 404. The length of the crack 402 due to indentation at a given load was measured and a procedure outlined in G.R. Anstis, et al., "A Critical Evaluation of Indentation Techniques for Measuring Fracture Toughness: I, Direct Crack Measurements", Journal of the American Ceramic Society, v64, n9, p533-538, 1981, was followed to derive an interface toughness value. This measurement it repeated multiple times, on samples with varying SOD, to create the interface toughness curve 308 shown in FIG. 3.

The fatigue life curve 310 in FIG. 3 was formed based on mechanical testing where metal-based substrate test bars were coated with the overlay metal-based coating at various SODs and tested under conditions to simulate the fatigue experienced by a certain component in service. The coated test bars were cycled until failure, and the total number of cycles to failure was compared to that for an uncoated test bar to determine the Fatigue Z score axis 306 in FIG. 3.

Figure 5:
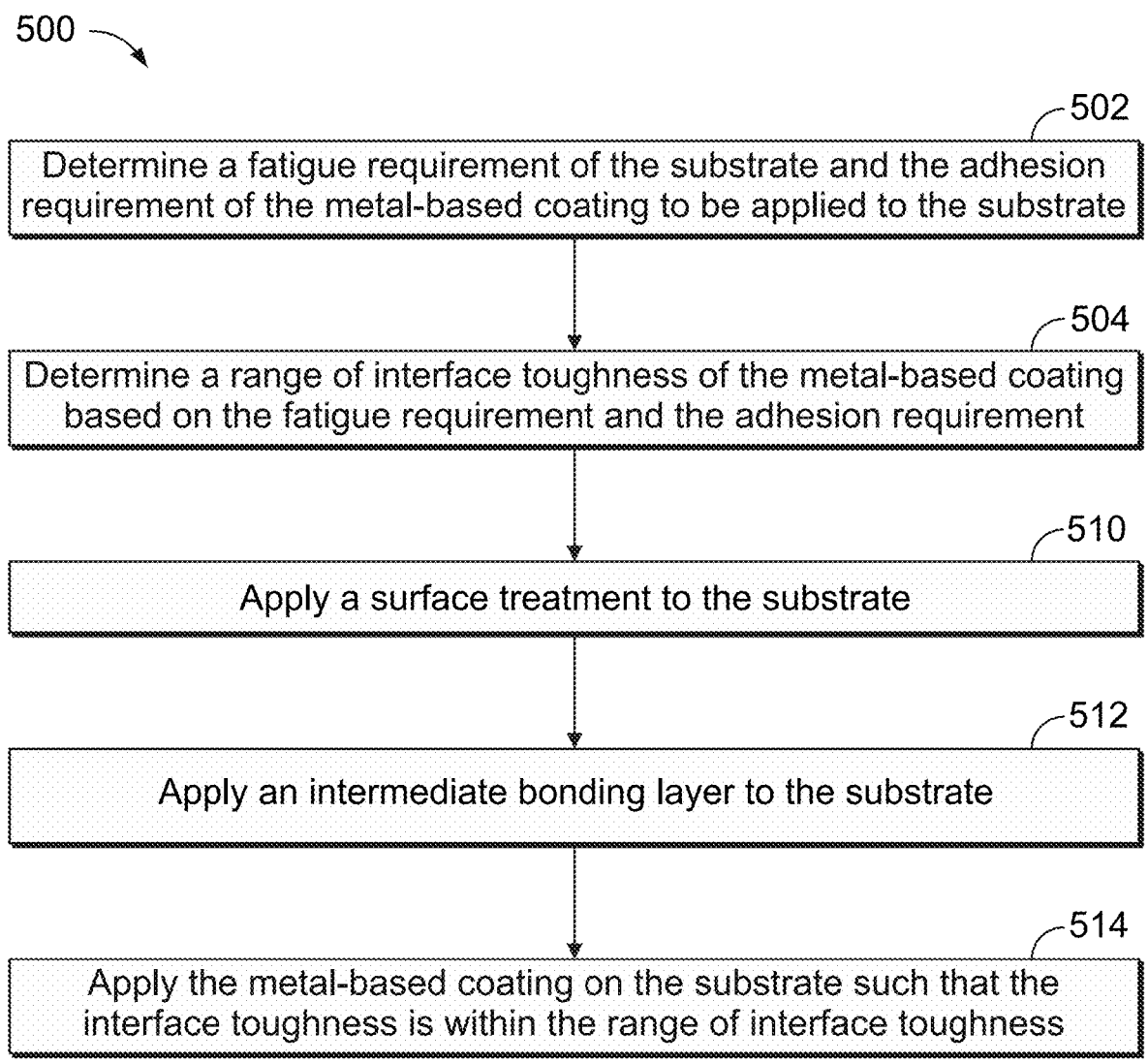
FIG. 5 illustrates a flow chart of an embodiment of a method for applying an overlay metal-based coating at a desired interface toughness to a substrate.

FIG. 5 illustrates a flow chart of an embodiment of a method 500 for applying an overlay metal-based coating at the range of interface toughness to the metal-based substrate. The method 500, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be used as one or more algorithms to direct hardware to perform one or more operations described herein.

Beginning at 502, a fatigue requirement 204 (FIG. 2) and adhesion requirement 206 are determined. For example, the fatigue requirement 204 may represent a low cycle fatigue requirement representing the cyclic loading of a material under high stress where an elastic limit is exceeded and the material undergoes plastic strain. The adhesion requirement 206 may represent a minimum number of cycles required for the overlay metal-based coating to adhere to the metal-based substrate. Optionally, the adhesion requirement 206 is based on characteristics and/or prior information of the metal-based substrate and/or the overlay metal-based coating.

At 504, the range of interface toughness 202 of the metal-based coating based on the fatigue requirement 204 and the adhesion requirement 202 is determined. The range of interface toughness 202 for the overlay metal-based coating is based on the fatigue and adhesion curves 214 and 212. The range of interface toughness 202 is configured such that a crack initiated within the overlay metal-based coating has a propagation path that is more energetically favorable along the interface interposed between the metal-based substrate and the overlay metal-based coating as compared to a path through the interface into the metal-based substrate.

At 510, a pre-coating treatment is applied to the surface treatment to the metal-based substrate. For example, the metal-based substrate 102 or a compound substrate surface of the metal-based substrate 102 may be altered to provide an acceptable range of interface toughness between the overlay metal-based coating 104 and the metal-based substrate 102 and/or the compound substrate surface as is known in the art.

At 512, an intermediate bonding layer is applied to the metal-based substrate 102 onto which the overlay metal-based coating 104 will be applied.

At 514, the overlay metal-based coating 104 is applied on the metal-based substrate 102 such that the interface toughness is within the range of interface toughness 202. For example, the HVAF spray gun as known in the art applies the overlay metal-based coating 104 at the SOD as shown in FIG. 3. Additionally or alternatively, an angle of the HVAF spray gun and/or temperature of the overlay metal-based coating 104 when emitted from the HVAF spray gun is utilized to increase or decrease the interface toughness of the overlay metal-based coating 104. Additionally or alternatively, the overlay metal-based coating can be applied in alternative processes as is known in the art, such as other thermal spray processes, cold spray, electroplating, physical vapor deposition, chemical vapor deposition, a slurry-based method, and/or the like.

In an embodiment, an article is provided. The article includes a metal-based substrate having an overlay metal-based coating disposed on the substrate at an interface. The interface is configured such that a crack formed within the overlay metal-based coating and approaching the interface has a propagation path that is more energetically favorable along the interface than through the interface and into the metal-based substrate.

Optionally, the interface toughness is selected to have a toughness with a lower bound of at least about 0.05 MPa$\sqrt{m}$ and an upper bound of less than about $0.5*\Delta K_{th}$ MPa $\sqrt{m}$. Optionally, the interface toughness is selected to have a toughness with a lower bound of at least about 0.1 MPa$\sqrt{m}$ and an upper bound of less than about $0.2*\Delta K_{th}$ MPa $\sqrt{m}$. Optionally, the interface toughness is selected to have a toughness with a lower bound of at least about $0.05*\Delta K_{th}$ MPa$\sqrt{m}$ to at least about 0.2 MPa$\sqrt{m}$, and an upper bound from about $0.2*\Delta K_{th}$ MPa$\sqrt{m}$ to about $0.5*\Delta K_{th}$ MPa$\sqrt{m}$. In one embodiment, the upper bound is $0.25*\Delta K_{th}$ MPa$\sqrt{m}$ and, in another embodiment, the upper bound is $0.2*\Delta K_{th}$ MPa$\sqrt{m}$. The lower bound can be 0.2 MPa$\sqrt{m}$ in one embodiment.

Optionally, the overlay metal-based coating comprises a nickel-based alloy, a cobalt-based alloy, an iron-based alloy, or any combination including one or more of these. Optionally, the metal-based substrate comprises a nickel-based alloy, a cobalt-based alloy, an iron-based alloy, or a combination including one or more of these. Additionally or alternatively, an intermediate bonding layer is interposed between the metal-based substrate and the overlay metal-based coating. The intermediate bonding layer is configured such that a crack formed within the overlay metal-based coating and approaching the intermediate bonding layer has a propagation path that is more energetically favorable along the intermediate bonding layer than through the interface and into the metal-based substrate.

In an embodiment, a method is provided. The method includes applying an overlay metal-based coating on a metal-based substrate. The interface between the overlay metal-based coating and metal-based substrate is configured such that a crack formed within the overlay metal-based coating and approaching the interface has a propagation path that is more energetically favorable along the interface than through the interface into the metal-based substrate. The overlay metal-based coating is at least one of a nickel-based, cobalt-based, or iron-based alloy, such as Alloy 625, Haynes 282, Alloy 718, or GT33, and the metal-based substrate is at least one of a nickel-based, cobalt-based, or iron-based alloy, such as Alloy 718, Alloy 706, R88DT, R104, R65, or U720. The interface between the overlay metal-based coating and the metal-based substrate has an interface toughness in a range from 0.05 MPa$\sqrt{m}$ to $0.5*\Delta K$th (MPa$\sqrt{m}$).

Optionally, applying the metal-based overlay coating comprises using a thermal spray process, cold spray, electroplating, physical vapor deposition, chemical vapor deposition, or a slurry-based method. Additionally or alternatively, the method includes applying a pre-coating surface treatment on the metal-based substrate. Additionally or alternatively, the method includes applying an intermediate bonding layer to the metal-based substrate.

In an embodiment, a method is provided. The method includes applying an overlay metal-based coating on a metal-based substrate via a thermal spray process. The interface between the overlay metal-based coating and metal-based substrate is configured such that a crack formed within the overlay metal-based coating and approaching the interface has a propagation path that is more energetically favorable along the interface than through the interface into the metal-based substrate. The overlay metal-based coating comprises a nickel-based alloy, a cobalt-based alloy, or any combination including one or more of these. The metal-based substrate comprises a nickel-based alloy. The interface between the overlay metal-based coating and the metal-based substrate has an interface toughness in a range from 0.1 MPa$\sqrt{m}$ to $0.2*\Delta K$th (MPa$\sqrt{m}$).

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An article, comprising:
a metal-based substrate having an overlay metal-based coating disposed on the substrate at an interface having an interface toughness, wherein the interface is configured such that a crack formed within the overlay metal-based coating and approaching the interface has a propagation path that is more energetically favorable along the interface than through the interface and into the metal-based substrate, wherein the interface toughness is in a range defined by an upper bound and a lower bound, wherein the lower bound is in a lower bound range from about 0.05 MPa$\sqrt{\text{m}}$ to about 0.2 MPa$\sqrt{\text{m}}$ and wherein the upper bound is $0.2*\Delta K_{th}$MPa$\sqrt{\text{m}}$, where $\Delta K_{th}$ is the fatigue crack growth threshold stress intensity of the substrate.

2. The article of claim 1, wherein the overlay metal-based coating comprises a nickel-based alloy, a cobalt-based alloy, an iron-based alloy, or any combination including one or more of these.

3. The article of claim 1, wherein the metal-based substrate comprises a nickel-based alloy, a cobalt-based alloy, an iron-based alloy, or a combination including one or more of these.

4. The article of claim 1, wherein an intermediate bonding layer is interposed between the metal-based substrate and the overlay metal-based coating, wherein the intermediate bonding layer is configured such that a crack formed within the overlay metal-based coating and approaching the intermediate bonding layer has a propagation path that is more energetically favorable along the intermediate bonding layer than through the intermediate bonding layer and into the metal-based substrate.

5. An article, comprising:
an overlay metal-based coating on a metal-based substrate, the overlay metal-based coating including a nickel-based alloy, a cobalt-based alloy, or any combination including one or more of these, the metal-based substrate including a nickel-based alloy, wherein the interface toughness between the overlay metal-based coating and the metal-based substrate is selected to have a lower bound of 0.1 MPa$\sqrt{\text{m}}$ and an upper bound of $0.25*\Delta K_{th}$MPa$\sqrt{\text{m}}$, where $\Delta K_{th}$ is the fatigue crack growth threshold stress intensity of the substrate, and wherein responsive to a crack within the overlay metal-based coating, the interface toughness is configured such that the crack formed within the overlay metal-based coating and approaching an interface between the overlay metal-based coating and the metal-based substrate has a propagation path that is more energetically favorable along the interface than through the interface and into the metal-based substrate.

6. A method, comprising:
applying an overlay metal-based coating on a metal-based substrate, wherein the interface between the overlay metal-based coating and metal-based substrate is configured such that a crack formed within the overlay metal-based coating and approaching the interface has a propagation path that is more energetically favorable along the interface than through the interface into the metal-based substrate, and wherein the overlay metal-based coating comprises a nickel-based alloy, a cobalt-based alloy, an iron-based alloy, or any combination including one or more of these wherein the metal-based substrate comprises a nickel-based alloy, a cobalt-based alloy, an iron-based alloy, or a combination including one or more of these, and wherein the interface between the overlay metal-based coating and the metal-based substrate has an interface toughness in a range defined by an upper bound and a lower bound, wherein the lower bound is in a lower bound range from about 0.05 MPa$\sqrt{\text{m}}$ to about 0.2 MPa$\sqrt{\text{m}}$, and wherein the upper bound is $0.2*\Delta K_{th}$MPa$\sqrt{\text{m}}$, where $\Delta K_{th}$ is the fatigue crack growth threshold stress intensity of the substrate.

7. The method of claim 6, wherein applying the metal-based overlay coating comprises using a thermal spray process, cold spray, electroplating, physical vapor deposition, chemical vapor deposition, or a slurry-based method.

8. The method of claim 6 further comprising applying a pre-coating surface treatment on the metal-based substrate.

9. The method of claim 6, further comprising applying an intermediate bonding layer to the metal-based substrate.

10. A method, comprising:

applying an overlay metal-based coating on a metal-based substrate using a high velocity air fuel (HVAF) spray gun, the overlay metal-based coating including a nickel-based alloy, a cobalt-based alloy, or any combination including one or more of these, the metal-based substrate including a nickel-based alloy, wherein the interface toughness between the overlay metal-based coating and the metal-based substrate is in a range defined by an upper bound and a lower bound, wherein the lower bound is in a lower bound range from about 0.05 MPa$\sqrt{m}$ to about 0.2 MPa$\sqrt{m}$, and wherein the upper bound is $0.2*\Delta K_{th}$ MPa$\sqrt{m}$, where $\Delta K_{th}$ is the fatigue crack growth threshold stress intensity of the substrate, the interface toughness of the article being based on a stand off distance of the HVAF spray gun as the overlay metal-based coating is applied to the metal-based substrate, responsive to a crack within the overlay metal-based coating, the interface toughness of the article is configured such that the crack formed within the overlay metal-based coating and approaching an interface between the overlay metal-based coating and the metal-based substrate has a propagation path that is more energetically favorable along the interface than through the interface and into the metal-based substrate.

* * * * *